INVENTORS
Ralph H. Bertsche, Jr.
Richard A. Carlson
Lewis R. Hetzler
Louis J. Raver
BY
Their Attorney

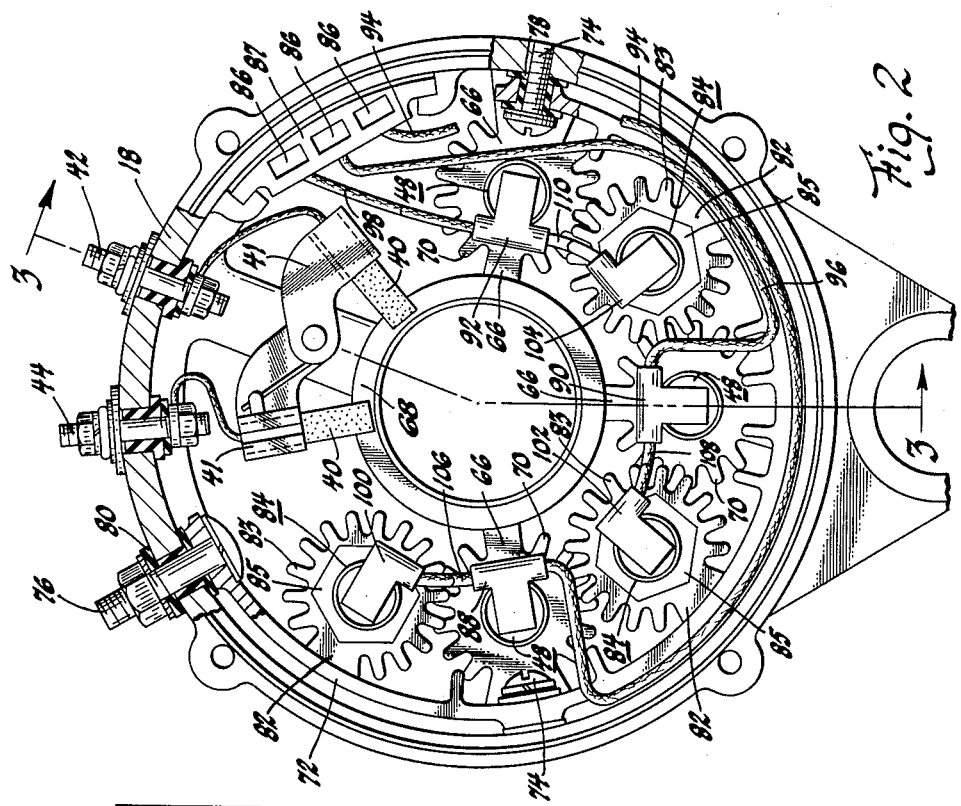

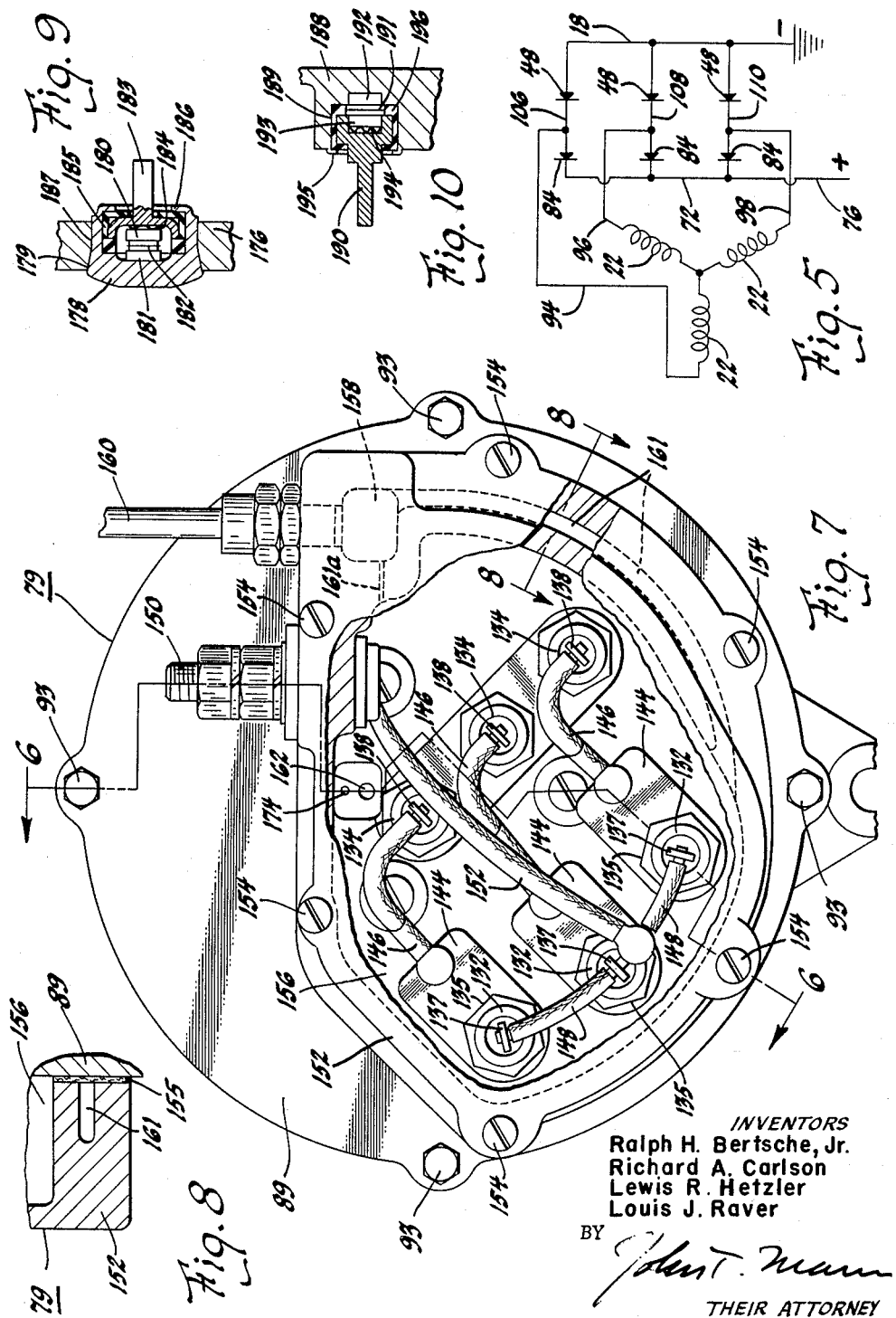

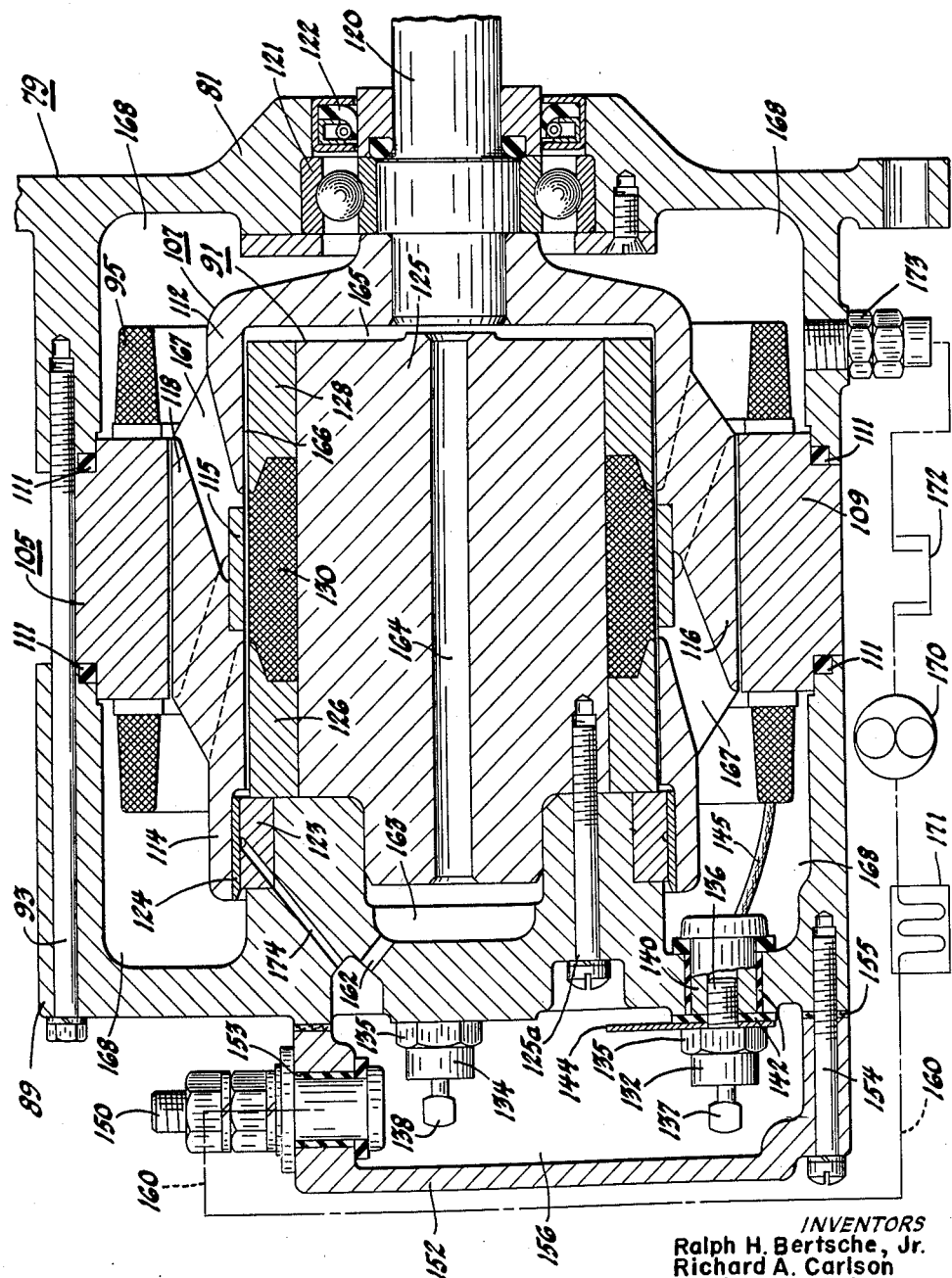
INVENTORS
Ralph H. Bertsche, Jr.
Richard A. Carlson
Lewis R. Hetzler
Louis J. Raver
THEIR ATTORNEY INVENTORS
Ralph H. Bertsche, Jr.
Richard A. Carlson
Lewis R. Hetzler
Louis J. Raver Their Attorney INVENTORS
Ralph H. Bertsche, Jr.
Richard A. Carlson
Lewis R. Hetzler
Louis J. Raver BY
*[signature]*
Their Attorney United States Patent Office 3,078,409
Patented Feb. 19, 1963

3,078,409
ELECTRICAL POWER CONVERTER
Ralph H. Bertsche, Jr., Royal Oak, and Richard A. Carlson, Clarkston, Mich., and Lewis R. Hetzler and Louis J. Raver, Anderson, Ind., assignors to General Motors Corporation, Detroit, Mich., a corporation of Delaware
Filed Feb. 26, 1959, Ser. No. 795,776
4 Claims. (Cl. 321—8)

This invention relates to electrical power converters, and more patricularly to apparatus for converting alternating current to direct current and is a continuation in part of copending application Serial No. 705,206 filed December 2, 1957 and now abandoned.

In many present-day electrical installations and particularly in motor vehicle applications, the amount of direct-current power required is ever increasing. In the motor vehicle field, the addition of more and more electrically-powered accessories to the vehicle has greatly taxed the D.C. power sources that are now available.

One possible solution to the problem of ever increasing power demand in motor vehicles is to increase the capacity of the presently-used D.C. generator. This solution has disadvantages, however, in that it is difficult to commutate a high output unit when the unit is driven by the engine of the motor vehicle which may have a speed range of 20 to 1.

It has been found that the direct current requirements of a motor vehicle can be readily satisfied where an alternating-current generator is used and where the output of the A.C. generator is rectified to produce a D.C. output. The A.C. generator has no commutation problems, produces more output per pound of material used and requires less maintenance.

One of the big problems encountered in the design of alternator-rectifier apparatus is the cooling of the rectifier. If the rectifier is operated above its rated temperature for any length of time the rectifiers are severely damaged. To accomplish cooling of the rectifier expensive auxiliary apparatus such as cooling fans driven by auxiliary motors have often been used. This auxiliary apparatus is not only expensive, but is bulky to the point where alternator-rectifier apparatus fitted with such auxiliary apparatus is very difficult to install where space is at a premium as on motor vehicles.

It is accordingly an object of this invention to provide a compact power conversion unit including an A.C. generator and one or more rectifiers wherein means are provided for effectively cooling the rectifiers without rendering the unit unduly bulky. This object is accomplished by mounting the rectifier in heat exchange relationship with the frame of the A.C. generator so that the generator operates as a heat radiator for the rectifier.

Another object of this invention is to provide a direct-current power unit wherein pn junction semiconductor rectifiers preferably of the silicon type are mounted on the end frame of an alternating-current generator. The silicon rectifiers can be made relatively small, thus not greatly increasing the bulkiness of the power unit, and by mounting them on the end frame the rectifiers are effectively cooled by heat transfer to the end frame which operates as a heat radiator.

Still another object of this invention is to provide a power unit including an A.C. generator and a rectifier wherein the rectifier is mounted directly in the end frame of the generator.

A further object of this invention is to provide a power unit including an alternating-current generator and a rectifier wherein the rectifier is mounted in heat transfer relationship with the end frame of the generator and wherein the end frame is heat insulated from the output winding of the generator.

Another object of this invention is to provide an A.C. generator having a housing and electrical windings with a rectifier that is mounted on the housing and wherein means are provided for circulating a cooling medium such as oil or air over the rectifier and windings for cooling the same.

Still another object of this invention is to provide a power unit including an A.C. generator and a rectifier, the rectifier being disposed within a cooling compartment that is associated with the frame of the generator and wherein a cooling medium such as oil is supplied to the cooling compartment for cooling the rectifier.

Further objects and advantages of the present invention will be apparent from the following description, reference being had to the accompanying drawings wherein preferred embodiments of the present invention is clearly shown.

In the drawings:

FIG. 2 is an end view of the left end frame of the generator shown in FIG. 1 as viewed from the right side of the end frame in FIG. 1.

FIG. 3 is a sectional view of the end frame shown in FIG. 2 taken along line 3—3 of FIG. 2.

FIG. 4 is a sectional view of one of the rectifier elements that are supported in the end frame of FIG. 3.

FIG. 5 is a circuit diagram showing the connections of the output windings and rectifiers of the generator shown in FIG. 1.

FIG. 6 is a vertical sectional view of an oil-cooled brushless alternator having a rectifier compartment that is provided with cooling oil, and taken along line 6—6 of FIG. 7.

FIG. 7 is an end view with parts broken away of the alternator shown in FIG. 6.

FIG. 8 is a sectional view taken along line 8—8 of FIG. 7.

FIG. 9 is a sectional view illustrating a modified mounting arrangement for mounting a rectifier in a solid body such as the end frame of an alternator.

FIG. 10 is a sectional view of still another modified arrangement for mounting a rectifier in a solid body such as an alternator end frame.

Figure 1:
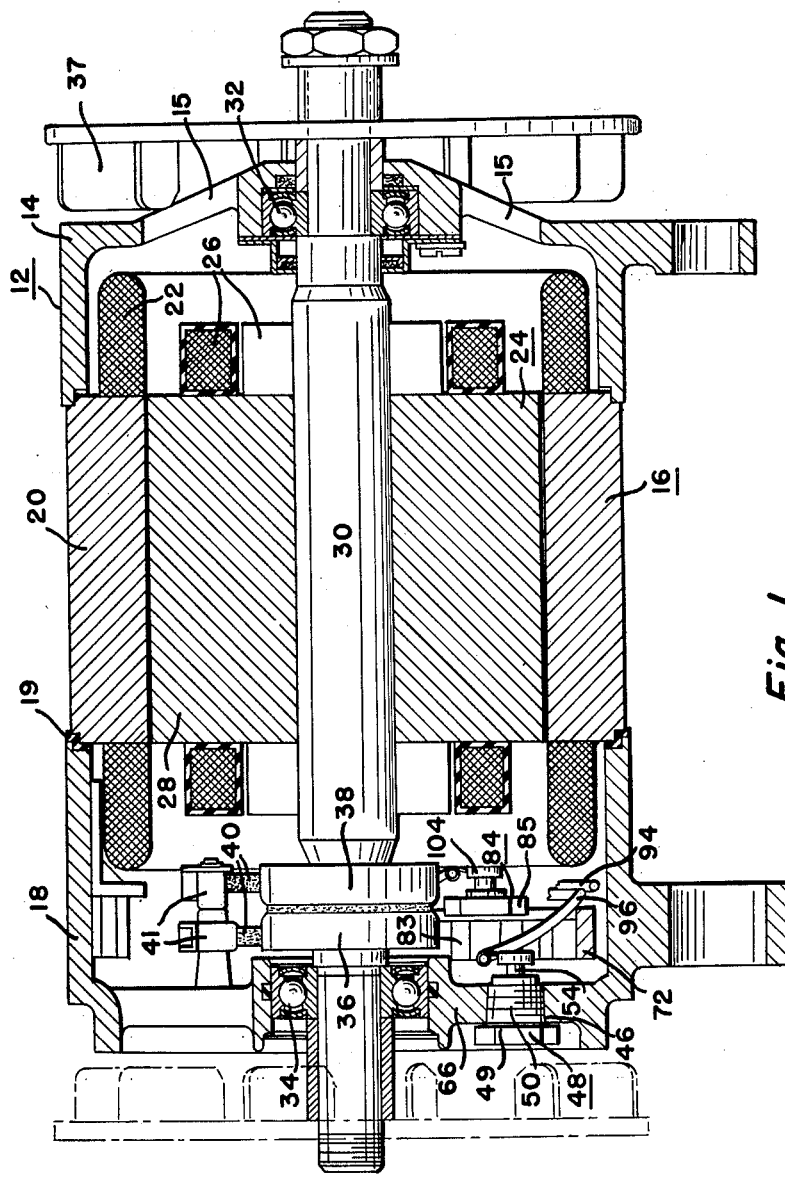
FIG. 1 is a vertical sectional view of an alternating-current generator that is provided with rectifiers in the end frame thereof.

Referring now to the drawings, and more particularly to FIG. 1, an alternating-current generator generally designated by reference numeral 12 is shown. The generator 12 comprises a drive end frame 14, a stator assembly 16, and a second end frame 18. The end frames 14 and 18 are formed of metal material such as cast aluminum or the like. The end frame 14 has four equally spaced openings 15, two of which are shown in FIG. 1 whereas the end frame 18 is open between webs 66. These openings in end frames 14 and 18 permit cooling air to be pulled through the generator as will become more readily apparent hereinafter. The stator assembly includes the usual ring of stator iron 20 and a stator winding 22 which is of the three-phase, Y-connected type, but which may be wound in other ways and could be a single-phase or two-phase winding. The end frames 14 and 18, and the stator assembly 16 are preferably held together by bolts (not shown) having heads that engage end frame 18 and having threaded portions that engage threaded bores (not shown) in end frame 14. A ring of heat insulating material 19 is interposed between the end frame 18 and stator iron 20 to prevent heat transfer therebetween. As far as certain aspects of the invention are concerned, it is immaterial what type of alternator is used. The alternator can be of the rotating field type as shown, or could be of the rotating armature type, the inductor type, or any other type known to those skilled in the art.

A rotor assembly generally designated by reference numeral 24 is concentrically disposed within the stator assembly 16 and comprises field windings 26 that are wound on iron core 28. The generator core 28 preferably has four poles and four field coil windings 26, three of which are illustrated in the sectional view of FIG. 1. It will be apparent to those skilled in the art that the rotor might have other than a four-pole arrangement. The rotor 24 is secured to a shaft 30 that is journalled in bearings 32 and 34 that are supported respectively in end frames 14 and 18.

The shaft 30 carries slip rings 36 and 38 which are insulated from each other and which co-operate with brushes 40, and also carries a fan 37 that is effective to pull air through the machine through end frame 18 and out end frame 14. The slip rings 36 and 38 are connected with field winding 26 by connections (not shown) while the brushes 40 are connected with field terminals 42 and 44 of FIG. 2 that are insulated from the end frame 18. The brushes are supported in brush holders 41 that are pivoted to the end frame and which are spring biased in a direction to insure good contact between the brushes and slip rings. The field terminals 42 and 44 are adapted to be connected across a suitable source of direct-current voltage for energizing field windings 26. It will be apparent that when the shaft 30 and field windings 26 are rotated at some predetermined speed and when the field windings are energized with a D.C. voltage, an A.C. voltage will be induced in stator winding 22.

The alternator just described is provided with rectifiers for converting the output A.C. voltage of stator winding 22 to direct current. To this end, the end frame 18 is provided with three threaded bores 46 which receive rectifier plugs 48 each having a hexagonal head 49 and a threaded portion 50 that engages the thread in a bore 46. One of the rectifier plugs 48 is shown in section in FIG. 4. As shown in FIG. 4, the plug which may be formed of a suitable metal such as aluminum or steel has a central cavity that is closed at one end by a terminal member 54. A rectifying element is interposed between a spring 56 and the case of the rectifier plug. The spring is soldered or otherwise secured to terminal member 54. The rectifying element comprises in part a layer of metal material 58 that may be of molybdenum, copper, or the like and which is soldered, held by the spring or otherwise secured to the case of rectifier plug 48.

A second layer of metal material 60 such as molybdenum is soldered or otherwise secured to spring 56. A layer of rectifying material 62 is interposed between the molybdenum layers 58 and 60. This rectifying material preferably formed of silicon having both p and n type material and is arranged to provide a rectifying junction. This sort of rectifier is commonly known in the art as a pn junction semiconductor rectifier, a silicon junction or junction rectifier. The junction has the normal rectifying characteristics, in that it freely passes current in one direction but blocks current flow in an opposite direction. The chamber 52 is sealed by sealing material 64 that is disposed between terminal 54 and a bent-over portion of the case of plug 48. This seal may be hermetic or non-hermetic and the sealing material is formed of glass, silicon rubber, or other suitable insulating material. In the structure shown in FIG. 4, the case of the plug 48 becomes one terminal side of the rectifier and the terminal 54 is the other terminal side of the rectifier. It will be appreciated that the rectifiers 48 could be of the germanium type as well as the silicon type.

Referring now more particularly to FIG. 2, it is seen that three rectifier plugs 48 are screwed into the end frame 18. The rectifier plugs are mounted in webs 66 that connect the bearing-supporting portion 68 of frame 18 and the outer portion of the frame. These webs are formed with heat dissipating fins 70 formed integrally with the webs which operate to radiate heat to the atmosphere. With this arrangement, the heat generated in the rectifier junctions 62 is conducted to the end frame 18 via the cases of rectifier plugs 48 and this heat is dissipated to the surrounding air by the entire frame 18 including the heat dissipating fins 70. With this arrangement, the end frame 18 operates as a large heat dissipating radiator for the rectifier plugs 48 containing the rectifiers 62.

The end frame 18 carries a subframe 72 as shown in FIGS. 2 and 3. The subframe 72 is bolted to the end frame 18 by a threaded fastener 74 and by a terminal bolt 76, the subframe being electrically insulated from the end frame by insulating material 78 and 80. The terminal bolt 76 is itself also electrically insulated from the end frame 18. The subframe 72 is provided with bosses 82 having heat radiating fins 83 that are similar to the heat radiating fins 70 of webs 66. Bosses 82 are provided with threaded bores like bores 46 to threadingly receive rectifier plugs 84. The three rectifier plugs 84 are identical with rectifier plugs 48 with the exception that the hexagonal head 85 of plug 84 is on the opposite end from its position on plug 48. In addition, plug 84 is different in that the opposite end of the case is threaded from its position on plug 48. The rectifier plug 84 is different from plug 48 in one other respect, in that the rectifying junction is reversed within the case to make the case of the opposite polarity. This means that in rectifier plug 84, the rectifying element is simply reversed from its position in plug 48 so that molybdenum layer 60 contacts the case in rectifier plug 84. The heat generated in rectifier plugs 84 is transmitted to the subframe 72 where it is radiated to the surrounding air.

The three-phase, Y-connected stator winding 22 is connected by conductors (not shown) with terminals 86 of a connector block 87 that is formed of insulating material and which is supported by end frame 18 as is shown in FIG. 2. The terminals 86 are connected to terminals 88, 90 and 92 by leads 94, 96 and 98 respectively. The terminals 88, 90 and 92 are connected to terminals 54 of rectifiers 48 and are connected to terminal members 100, 102 and 104 by connecting leads 106, 108 and 110 as shown. The terminal members 100, 102 and 104 are connected to the terminals 54 of rectifiers 84. With this circuit connection, the respective terminal ends 54 and 97 of rectifiers 48 and 84 are connected together and to a respective phase of three-phase stator winding 22.

From the foregoing, it will be readily apparent to those skilled in the art that the rectifier of rectifier plugs 48 and 84 are connected in a three-phase, full-wave bridge rectifier circuit. The connection of the rectifiers is more simply shown in the circuit diagram of FIG. 5 wherein like reference numerals to those used in FIG. 2 are used to identify identical parts. For the sake of simplicity, the rectifiers shown in FIG. 5 are designated by the reference numerals of the rectifier plugs and will be referred to as rectifiers although it is realized that the actual rectifying element is in the case. In FIG. 5 the end frame 18 is shown as an electrical conductor as is the subframe 72. The rectifiers 48 have one side (the case side) connected to the conducting end frame 18. The end frame is shown grounded and is the negative output terminal of the bridge rectifier. The rectifiers 84 have one side (the case side) connected to the subframe 72 and this is the positive terminal 76 of the bridge rectifier. As was described above, the rectifiers are poled in different directions with respect to frame 18 and subframe 72, the rectifiers 84 having one polarity connected to subframe 72 and the rectifiers 48 having an opposite polarity connected to end frame 18.

The opposite sides of rectifiers 48 and 84 are connected by leads 106, 108 and 110 and these leads are connected to stator windings 22 by leads 94, 96 and 98.

When the rotor of the A.C. generator shown in FIG. 1 is being rotatably driven by a source of motive power, the fan 37 pulls air through end frame 18, thence over the rotor and stator windings of the generator and out through openings 15 in end frame 14. This air will of course pass over the webs 66 in end frame 18 cooling the same and cooling the rectifiers 48 mounted therein. This air will also cool the subframe 72 and rectifiers 84 mounted therein. The end frame 18 will of course act as a large heat radiator as will the subframe 72. If desired the fan 37 might be mounted at the left end of the generator as illustrated in the phantom lines of FIG. 1. With such a mounting, air would be drawn through end frame 14 and would be exhausted through end frame 18.

With the arrangement just described, a very compact D.C. power unit is provided. The rectifiers of the unit are not bulky so as to take up a lot of space and an effective method of maintaining the rectifiers relatively cool has been provided by mounting the rectifiers in the end frame of the alternator that forms a part of the unit. Although a particular rectifier circuit has been disclosed, it will be apparent that other rectifier circuits could be used and still employ the method of maintaining the rectifiers cool as disclosed herein, including single phase, full or half wave rectifier circuits where the alternator is a single phase unit.

Referring now more particularly to FIG. 6, a modified alternator-rectifier power unit is shown wherein both the alternator and rectifier are oil cooled. The alternator is generally designated by reference numeral 79 and is of the type shown in copending application Serial No. 589,759 filed June 6, 1956 and now Patent 2,928,963. The alternator as shown in FIG. 6 comprises a drive end frame 81, a second end frame 89, a stator assembly 105, a field assembly 91 and a rotor assembly 107. The end frames 81 and 89 and stator assembly 105 are held in fixed relationship with one another by bolts 93 which are threaded into drive end frame 81. The stator assembly 105 includes the usual ring of stator iron 109 and a three-phase, Y-connected stator winding 95. The stator iron has a liquid-tight fit with the end frames by reason of the seals 111 that are interposed between the end frames and stator iron. The seals are formed of any suitable sealing material such as rubber.

The rotor assembly 107 comprises two parts of magnetic material 112 and 114 that are separated by a nonmagnetic part 115 that is welded or otherwise secured to magnetic parts 112 and 114. The magnetic part 112 has axially-extending fingers 116 that are interleaved with and spaced from axially extending fingers 118 that are integral with magnetic part 114. The construction of the fingers is like that of the fingers of the rotor shown in above-noted copending application, Serial No. 589,759 now Patent 2,928,963.

The magnetic part 112 of rotor assembly 107 is welded or otherwise secured to a drive shaft 120 which is journalled in a bearing 121 that is supported by end frame 81. A suitable seal 122 is fitted to the end frame 81 to prevent oil from passing out of the alternator. The other end of the rotor assembly 107 is supported by a bearing that includes a metal bearing block 123 that is fixed to end frame 89 and annular metal bearing member 124 that is secured to magnetic part 114. With the above-described arrangement, the rotor assembly 107 is supported for rotation by bearing 121 and the bearing parts fixed to end frame 104 and magnetic part 114.

The fixed field assembly 91 comprises an iron core member 125 that is fixed to end frame 89 by one or more bolts 125a. The iron core carries iron members 126 and 128 which serve to hold a field winding 130 in place on the iron core.

The alternator just described does not need brushes as both the flux generating field winding 130 and output stator winding 95 are fixed from rotation. When the shaft 120 is connected to a suitable source of power, such as the engine of a motor vehicle, the interleaved teeth of the rotor assembly rotate between the field 91 and the stator winding 95. With the field winding connected to a suitable source of direct current, an alternating flux is set up in the stator that links the stator winding 95 to induce an A.C. voltage therein. The flux alternates with respect to the stator because the rotating fingers 116 and 118 of rotor assembly 107 become north and south poles respectively when the field 130 is energized.

The end frame 89 of alternator 79 is provided with rectifier plugs 132 and 134 as shown in FIGS. 6 and 7. The rectifier plugs 132 each have a hexagonal tool engaging portion 135 and each carry a stud 136. Each rectifier plug 132 also has a terminal 137 which is one terminal side of the rectifier. The case of these rectifier plugs is formed of metal as is the stud 136 and terminal 137. The rectifier plugs 132 are preferably constructed internally in a fashion similar to the construction of the rectifier plug 48 shown in FIG. 4. Thus the case of rectifier plugs 132 contains a rectifying element identical with element 62 shown in FIG. 4. The case of rectifier plug 132 thus becomes one terminal side of the rectifier and the terminal 137, which is insulated from the case, becomes the other terminal side. The rectifier plugs 134 are identical with rectifier plugs 132.

The rectifier plugs 132 are bolted to metal terminal studs 140 that are electrically insulated from end frame 89 by suitable electrical insulating material 142 that is interposed between the end frame and blocks. Each block 140 has a threaded bore which receives the studs 136 of rectifier plugs 132. A heat conducting metal strip 144 is interposed between the hexagonal head of each rectifier plug and insulating material 142 as shown in FIG. 6. The metal strips 144 are primarily heat dissipating surfaces to get more area in contact with a cooling oil as will become more readily apparent hereinafter. The strips also form a terminal connection for the cases of plugs 132. It will be apparent that the terminals 144 are in electrical contact with the case of plugs 132 and thus in electrical contact with studs 136 which are a part of the case.

The rectifier plugs 134 have studs (not shown) that are identical with studs 136 and which are received in threaded bores formed directly in end frame 89. With this arrangement, the case of the rectifier which carries the studs is directly connected to the end frame 89. This provides for good heat transfer between the rectifier plugs 134 and the end frame 89 as well as providing an electrical connection therebetween.

The terminal blocks 140 are each connected respectively with one phase of the three-phase stator winding 95 by three conductor leads 145 only one of which is shown in FIG. 6. Since the studs 136 are in electrical contact with blocks 140, the terminals 144 are electrically connected with the output conductors 145 of three-phase stator winding 95. The terminals 144 thus become input terminals for a three-phase, full-wave bridge rectifier that includes rectifiers 132 and 134 as will become more readily apparent hereinafter.

The terminals 144 are connected with terminals 138 of rectifier plugs 134 by means of leads 146, as shown in FIG. 7. The terminals 137 of rectifier plugs 132 are connected together by leads 148 to form a common connection that is connected to a D.C. output terminal stud 150 by lead 152. The stud 150 is supported by a housing 152 and is electrically insulated therefrom by insulating material 153. The rectifying elements contained in rectifier plugs 132 and 134 are all polarized in the same direction, the stud 136 being one rectifier terminal of plug 132 and the terminal 137 being the other. In the case of rectifier plugs 134, a common side of the rectifying elements contained in the plugs is electrically connected directly to the end frame 89 whereas in rectifier plugs 132, the terminals 137 are connected together.

It will be apparent to those skilled in the art that the connection of the rectifiers 132 and 134 provides a three-phase, full-wave bridge rectifier of the type illustrated in FIG. 5. This bridge rectifier has input terminals 144 connected with the three-phase stator windings 95. The output terminals of the rectifier are the positive output terminal 150 and a negative output terminal which is the end frame 89.

The alternator-rectifier unit shown in FIGS. 6 and 7 is oil cooled to maintain both the rectifiers and the alternator cool. To this end, a housing 152 is secured to the end frame 89 and is held in place by bolts 154. A suitable sealing gasket 155 or other type of seal is disposed between housing 152 and end frame 89. The housing 152 and end frame 89 completely enclose the rectifier plugs 132 and 134 and form a cooling compartment denoted by reference numeral 156. The housing 152 has an inlet chamber 158 that is connected with an inlet pipe 160 as shown in FIG. 7. The chamber 158 is connected with the lower end of compartment 156 by means of a passage 161 formed in the housing 152 and having an open-side facing gasket 155 as more particularly shown in FIG. 8. The chamber 158 is also connected with compartment 156 by a small bleed hole 161a that prevents back siphoning of oil through pipe 160.

The end frame 89 of alternator 79 has a passage 162 that is located above the rectifier plugs 132 and 134 which connects a chamber 163 with compartment 156. The field core 125 of alternator 79 has a central passage 164 that communicates with the space 165 defined by rotor assembly 107 and field core 125, and which also communicates with chamber 163. The space 165 communicates with annular air gap 166 which, in turn, communicates with spaces 167 formed between the interleaved fingers 116 and 118 of rotor assembly 107. The passages 167 communicate with the spaces 168 located adjacent the ends of stator winding 95.

The inlet pipe 160 as shown schematically in FIG. 6 is connected with the outlet of a pump 170 that is connected with a sump 172 which, in turn, is connected with a fitting 173 that communicates with the lower end of alternator 79 adjacent end frame 81. A suitable oil cooler 171 is interposed in line 160 to cool the oil being supplied to the alternator. In motor vehicle installations, the sump may actually be the flywheel or transmission housing of the motor vehicle and in such an arrangement the lower end of end frame 81 may be open so that the internal lower area of the alternator would be in open communication with the interior of the flywheel or transmission housing. The sump 172 contains a quantity of oil which may be engine oil and which is circulated over the rectifiers and through the alternator. Where the generator is used on motor vehicles the pump 170 is driven by the engine of the vehicle as is the alternator.

When pump 170 is in operation, oil is pumped into the lower end of compartment 156 via conduit 160, chamber 158, and passage 161. The oil rises in chamber 156 until the level of oil is as high as passage 162 whereupon the oil flows through passage 162 into chamber 163, and through passage 174 to bearing 124. The oil then passes through passage 164, through space 165, and then into air gap 166. The oil in air gap 166 contacts field winding 130 and is thrown radially through passages 167 onto the stator winding 95 when rotor assembly 107 is rotating. The oil after being thrown against stator winding 95 leaves the alternator via fitting 173 and returns to sump 172.

It will be appreciated that with the described oil circuit, the rectifiers 132 and 134, the field winding 130 and the stator winding 95 are all cooled by contact with the oil. The oil is fed to the lower end of chamber 156 and exits adjacent the top end thereof in order to insure that compartment 156 will always be full of oil to a level above the uppermost rectifier plug 134. This is important in satuations where the alternator may have been idle for a period of time. With the arrangement described, the compartment 156 retains a level of oil after shutdown of the alternator so that when the alternator is once more started the rectifier plugs have an initial oil cooling. The passage 161a prevents back siphoning of oil towards pump 170 in the event that a suction pressure occurs at the pump. With the arrangement described, the bearing 124 is also lubricated by oil passing through a passage 174 that connects the bearing surfaces and passage 162.

FIG. 9 illustrates a modified method of mounting a rectifier in a solid metal body 176. In this arrangement, the rectifier plug 178 is formed of metal material such as aluminum or copper and the case is tapered as at 179. The plug 178 contains two metallic members 180 and 181. Sandwiched between the copper members is a rectifying element 182 that is comprised of two molybdenum layers separated by a rectifying junction of the type shown in FIG. 4. The molybdenum layers contact the copper members 180 and 181. The rectifier plug 178 also partially contains a terminal 183. A wave washer 184 is interposed between the terminal 183 and copper member 180. The terminal 183 is insulated from the case of rectifier plug 178 by insulating material 185 which is held against terminal 183 by bent-over portions 186 of plug 178. The bent-over portions hold the parts of the rectifier assembly in place while the wave washer insures good pressure contact between copper member 180 and rectifier 182, between copper member 181 and plug 178.

In this embodiment, the case of plug 178 is one terminal of the rectifier and the terminal 183 becomes the other terminal of the rectifier. The plug 178 is press fitted within a bore 187 formed in solid metal part 176 and the bore has an internal configuration that complements the external configuration of plug 178. It will be appreciated that the rectifier shown in FIG. 9 and its mounting arrangement could be used in place of the rectifier plugs shown in FIGS. 3 and 6 by modifying the bores in the solid metal parts which carry the rectifier plugs.

Referring now to FIG. 10, another rectifier mounting is shown which may be substituted for the rectifiers shown in FIGS. 3 and 6. In FIG. 10 a solid metal body 188, which may be the end frame of an alternator, is provided with a bore 189 that receives a terminal stud 190. A rectifying element 191 is fitted within the bore and is engaged at opposite sides by metal members 192 and 193. A wave washer 194 is interposed between terminal stud 190 and metal member 193. In this embodiment the elements of the rectifier are held within the bore 189 by staking over a portion of solid body 188 at 195. A quantity of electrical insulation 196 is disposed between the rectifier elements and the solid body 188. With the arrangement just described, the rectifier is encapsulated directly in the metal body 188, the body becoming one terminal end of the rectifier and the terminal stud 190 becoming the other terminal end.

Figure 11:
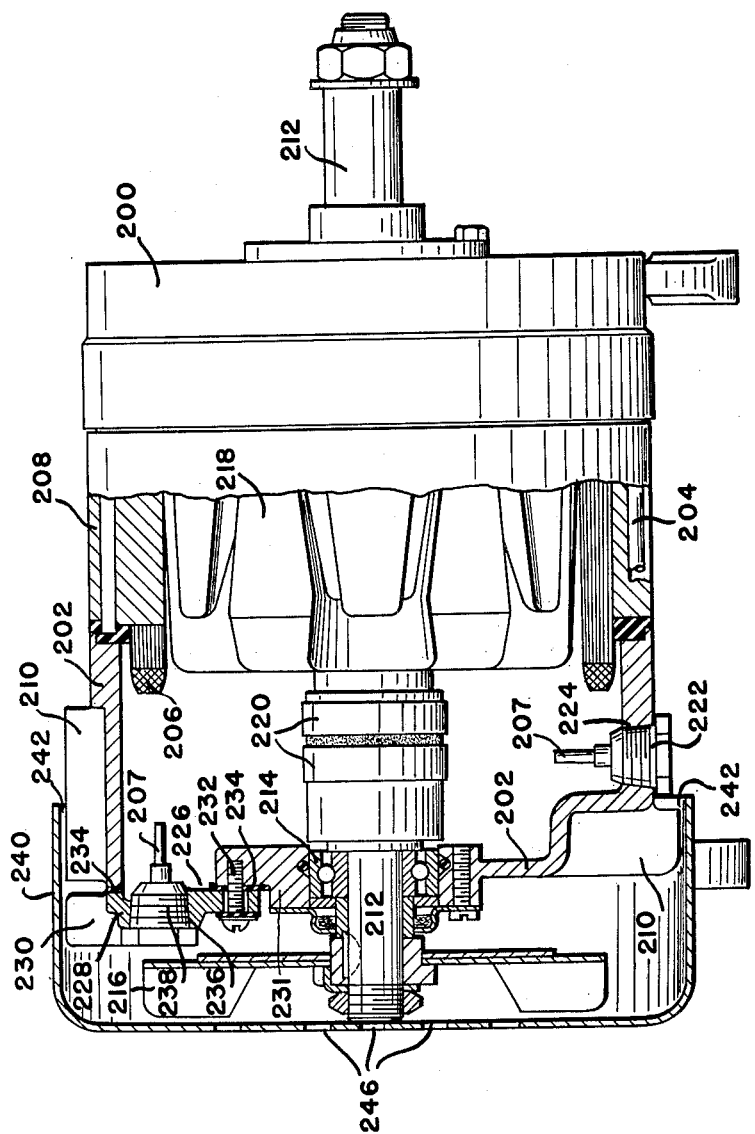
FIG. 11 is a side view with parts broken illustrating an A.C. generator and having a modified rectifier mounting arrangement.
Figure 12:
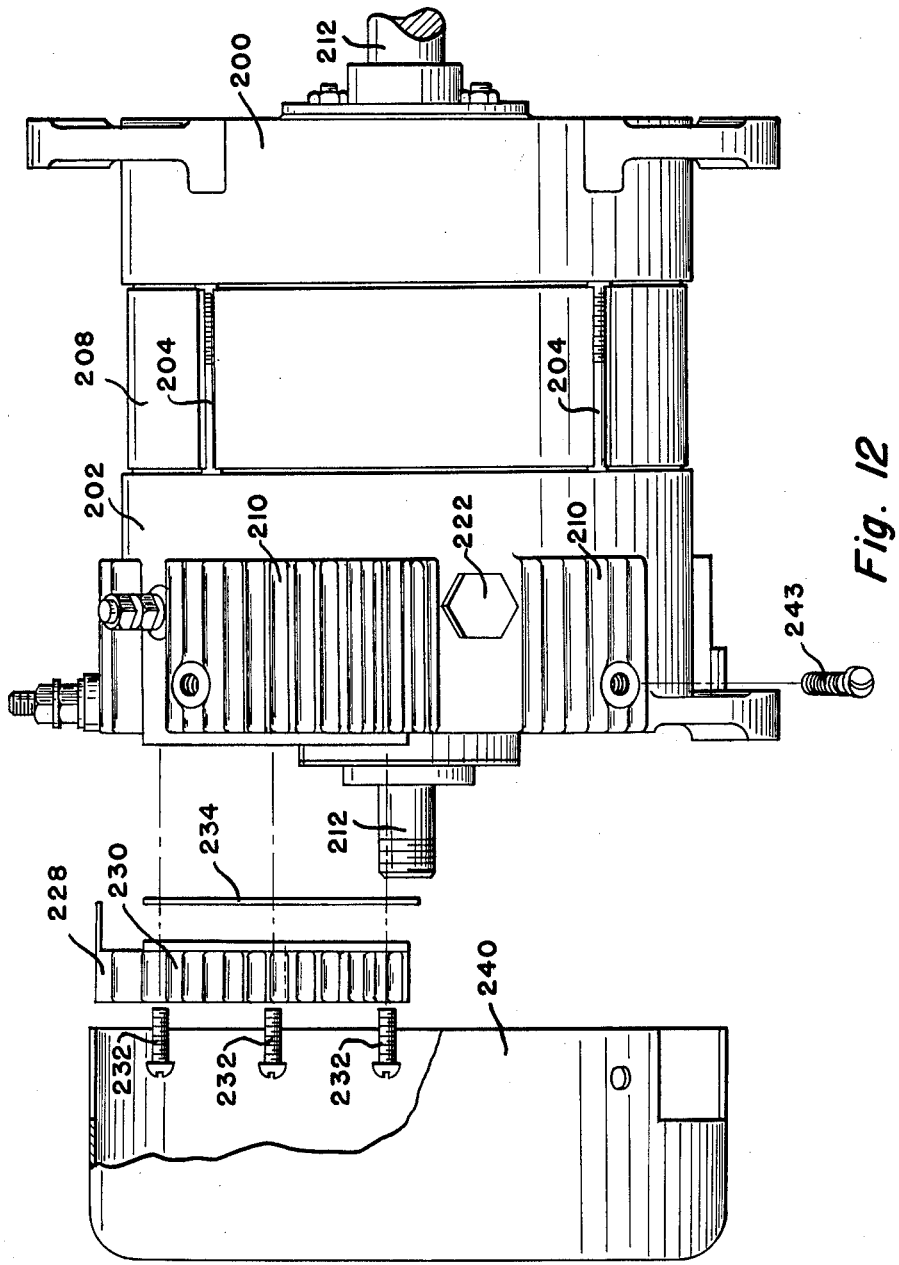
FIG. 12 is a side view of the A.C. generator illustrated in FIG. 11 with the shroud removed and showing the heat sink for one group of rectifiers removed from the end frame of the generator.

Referring now more particularly to FIGURES 11 and 12, another modified arrangement for mounting rectifiers on an A.C. generator is illustrated. In the arrangement of FIGURES 11 and 12, air is not pulled through the generator to cool the rotatable field and stator windings but rather is only pulled over the outside of the generator end frame and rectifiers to cool the same.

Referring now to FIGURE 11, it is seen that the A.C. generator comprises end frames 200 and 202 which are held together by through bolts 204 shown in FIGURE 12. The stator winding 206 of the generator illustrated in FIGURES 11 and 12 is supported on the usual ring of stator iron 208 held between end frames 200 and 202. The end frame 202 is formed of cast aluminum and has integral heat radiating ribs or fins designated by reference numeral 210. The end frame 200 has a bearing, not shown, which supports a shaft 212. The shaft 212 is rotatably mounted within another bearing 214 supported in end frame 202. The shaft 212 carries a cooling fan 216 and also carries a rotor assembly generally designated by reference numeral 218. The rotor assembly is of the Lundell type including interleaved fingers and has a field winding located concentrically within the fingers that rotates with the shaft 212. This type of rotor construction is conventional and is well known to those skilled in the art. Shaft 212 carries slip rings 220 which cooperate with brushes, not shown. It will be apparent to those skilled in the art that the slip rings 220 will be connected with the field winding that rotates with the rotor assembly 218. These slip rings 220 and consequenly the field coil for the rotor 218 will be supplied with direct current. An A.C. voltage will be generated or induced in the stator winding 206 when the rotor 218 is rotatably driven through shaft 212.

The end frame 202 is fitted with one or more PN junction semi-conductor rectifiers preferably of the silicon type and designated by reference numeral 222. Where the stator winding 206 is of the three-phase type, three rectifiers 222 are required. These rectifiers are mounted along the outer periphery of the lower part of the end frame 202 and are located radially of the longitudinal axis thereof. It is preferred that the three rectifiers 222 be mounted along the lower circumferential half of the circular end frame 202. It is apparent, however, that they might be mounted in other arrangements. The rectifiers are simply threaded into threaded bores 224 formed in the end frame 202 and these bores are positioned at spaced areas along the lower outer circumference of the end frame 202 that have no cooling fins.

It will be readily apparent that the end frame 202 shown in FIGURE 11 completely encloses the left end of the generator except for an open area designated by reference numeral 226. The open area 226 is preferably made arcuate in shape and is closed by a heat sink or block designated by reference numeral 228. The heat sink or block is formed of cast aluminum as is better illustrated in FIGURE 12 has a plurality of cooling fins 230 located along its outer circumference. The heat sink or aluminum block 228 is secured to a central portion 231 of end frame 202 by means of fasteners 232. These fasteners are suitably electrically insulated from heat sink 228 as is apparent from FIGURE 11. The heat sink or block 228 is electrically insulated from end frame 202 by a thin sheet of mica insulation 234 which has a central opening to permit the passage of a rectifier therethrough. The heat sink or block 228 is formed with threaded bores 236 which are adapted to receive rectifier plugs 238 that are of the PN junction semi-conductor type. Where the stator winding 206 is of the three-phase type, there are three bores formed in the block 228 and these three threaded bores accommodate three rectifier plugs 238. It is seen that the ends of the rectifier plugs 238 project into the opening in mica insulator 234 and project into the interior of end frame 202.

Rectifiers 222 and 238 will, of course, be of opposite polarities and will be connected with the stator winding 206 in a manner illustrated in FIGURE 5 of the drawings. These rectifiers are of the same type as those illustrated in FIGURE 1 of the drawings, namely, of the PN junction semiconductor type either germanium or silicon. The rectifiers are connected in circuit with the stator winding 206 by lead connections 207 and in a manner illustrated in FIGURE 5 of the drawings.

The end frame 202 of the generator illustrated in FIGURES 11 and 12 is fitted with a shroud 240 that is secured to the end frame by fasteners 243. It is noted that the shroud 240 is spaced from the cooling fins 210 a sufficient amount to permit air to flow through the annular area designated by reference numeral 242. The shroud 240 is provided with inlet air openings 246 which permit air to be drawn through the shroud when the fan 216 is being rotated by shaft 212. When shaft 212 is rotating, the fan 216 is rotated to draw air through the openings 246 in shroud 240 and this air is exhausted through the area designated by reference numeral 242. Air is also exhausted axially between the cooling fins 210 located circumferentially of end frame 202. The air in passing between inlet openings 246 and over the outer circumference of end frame 210 passes over the block 228 and over the three rectifiers mounted in the block. In this way, any heat generated in the rectifiers 238 is conducted to the heat sink 228 and this heat sink and the rectifiers mounted therein are caused to be cooled by air flowing thereover. In a like manner, air exhausted through the annular area designated by reference numeral 242 will pass in contact with the circumferentially extending portion of end frame 202 cooling the same, and will also pass in contact with the ends of rectifiers 222. The cooling fins 210 mounted on the end frame 202 are also subjected to a blast of air exhausting over the annular area designated by reference numeral 202.

It can be seen from the foregoing that the A.C. generator of FIGURES 11 and 12 is totally enclosed at its left end, there being no air passage through the generator from left to right when it is operated. With such a construction, the interior of the generator is maintained free of dirt, dust and the like which would be detrimental to the slip ring parts of the generator. In the arrangement of FIGURES 11 and 12, however, even with an enclosed generator, it is possible to maintain the rectifiers cool by the mounting arrangement of this invention. It is seen that the arrangement of FIGURES 11 and 12 differs from the arrangement of FIGURE 1 in that in the arrangement of FIGURES 11 and 12, the air is forced over the outer circumference of the end frame 202 rather than passing through the end frame and through the generator where it is exhausted through the second end frame.

While the embodiments of the present invention as herein disclosed constitute a preferred form, it is to be understood that other forms might be adopted.

What is claimed is as follows:

1. In combination, an alternating-current generator having a housing formed in part by an end frame, an output winding in said housing, a member attached to said end frame forming a compartment therewith, a rectifier having an outer metal part located in an opening formed in said end frame and extending into said compartment, means electrically connecting said rectifier and output winding, means for supplying a cooling medium to said compartment adjacent the lower end thereof, and passage means in said housing located above said rectifier connecting the interior of said compartment with the interior of said housing.

2. In combination, an alternating-current generator having a housing formed in part by an end frame enclosing a fixed stator winding and a fixed field winding that is spaced from said stator winding, a rotor including a pair of magnetic parts separated by a nonmagnetic part rotatable between said stator winding and field winding, a member attached to said end frame and forming a compartment therewith, a semiconductor rectifier having an outer metal part located in an opening formed in said end frame and extending into said compartment, means electrically connecting said rectifier and stator windings, means for supplying said compartment with a cooling medium at a point located below said rectifier, and passage means connecting said compartment and the interior of said housing having an inlet located above said rectifier.

3. In combination, an alternating current generator having housing means enclosing a three phase output winding, said housing means being formed at least in part by an end frame, heat dissipating means supported by said end frame and electrically insulated therefrom, a plurality of first junction rectifiers each having an outer metal part mounted at least in part in openings formed in said end frame and in direct contact therewith whereby each one of their terminals is electrically connected to said end frame by said metal parts, a plurality of second junction rectifiers each having an outer metal part mounted in said heat dissipating means in direct contact therewith and each having one of their terminals electrically connected to said heat dissipating means by said metal part, a member secured to said end frame forming a compartment therewith which encloses all of said rectifiers, a cooling medium inlet opening for said compartment located below all of said rectifiers, an opening forming in said end frame located above all of said rectifiers and connecting the interior of said housing with the interior of said compartment, and means electrically connecting said rectifiers with said output winding and in a three phase full wave network.

4. In combination, an alternating current generator having a housing enclosing a three phase output winding and formed at least in part by an end frame, heat dissipating means supported by said end frame and electrically insulated therefrom, and a three phase, full wave bridge rectifier circuit connected with said three phase output winding, said circuit comprising, a plurality of first plug type rectifiers having outer metal parts mounted in openings formed in said end frame in direct contact therewith and each having one of their terminals electrically connected to said end frame, a plurality of second plug type rectifiers mounted in said heat dissipating means in direct contact therewith and each having one of their terminals connected to said heat dissipating means, a member attached to said end frame and forming a compartment therewith which encloses all of said rectifiers, a cooling medium inlet opening connected with said compartment and located below all of said rectifiers, passage means formed in said end frame connecting said compartment with the interior of said housing, and a relief passage connecting said cooling medium inlet with said compartment.

References Cited in the file of this patent

UNITED STATES PATENTS

| | | |
|---|---|---|
| 1,899,741 | Bauer | Feb. 28, 1933 |
| 2,011,605 | Atherton | Aug. 20, 1935 |
| 2,383,669 | Moore | Aug. 28, 1945 |
| 2,497,141 | Schultz | Feb. 14, 1950 |
| 2,550,013 | Kureth | Apr. 24, 1951 |
| 2,657,343 | Wilson | Oct. 27, 1953 |
| 2,722,652 | Brainard | Nov. 1, 1955 |
| 2,740,924 | Brainard | Apr. 3, 1956 |
| 2,935,666 | Van Namen | May 3, 1960 |
| 2,972,711 | Sorokin et al. | Feb. 21, 1961 |
| 3,001,121 | Kerr | Sept. 19, 1961 |

FOREIGN PATENTS

| | | |
|---|---|---|
| 627,006 | Great Britain | July 26, 1949 |
| 713,886 | Great Britain | Aug. 18, 1954 |